Patented Aug. 4, 1953

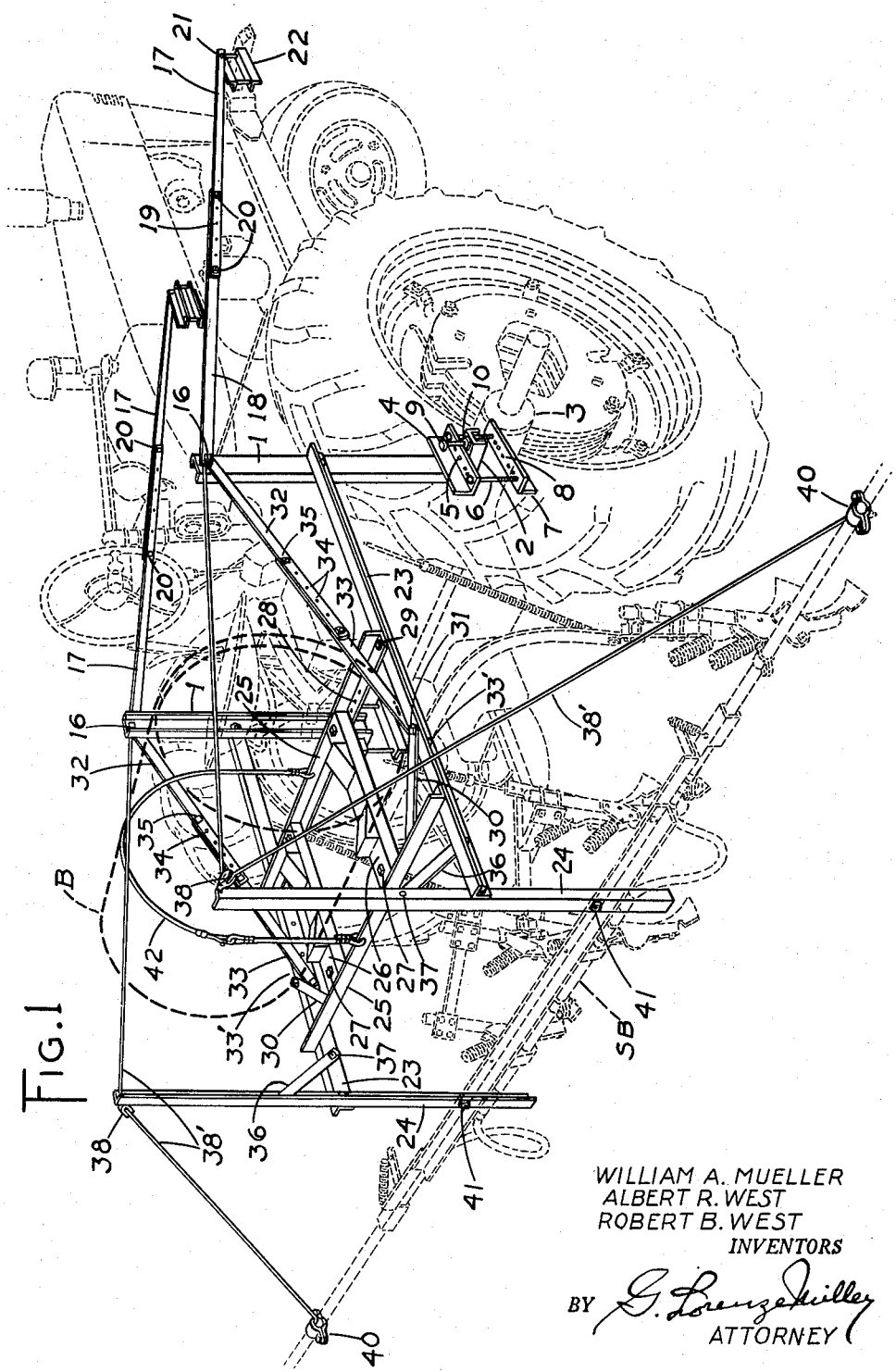
Aug. 4, 1953 W. A. MUELLER ET AL 2,647,794
SPRAY RIG SUPPORTING FRAME FOR FARM TRACTORS
Filed Sept. 24, 1951 2 Sheets-Sheet 1
WILLIAM A. MUELLER
ALBERT R. WEST
ROBERT B. WEST
INVENTORS
BY
ATTORNEY

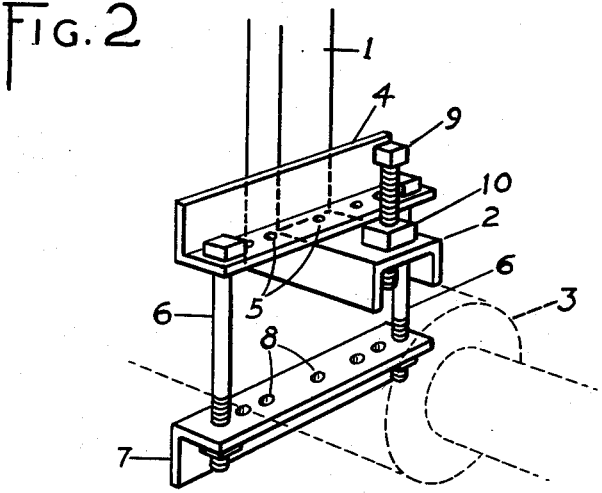
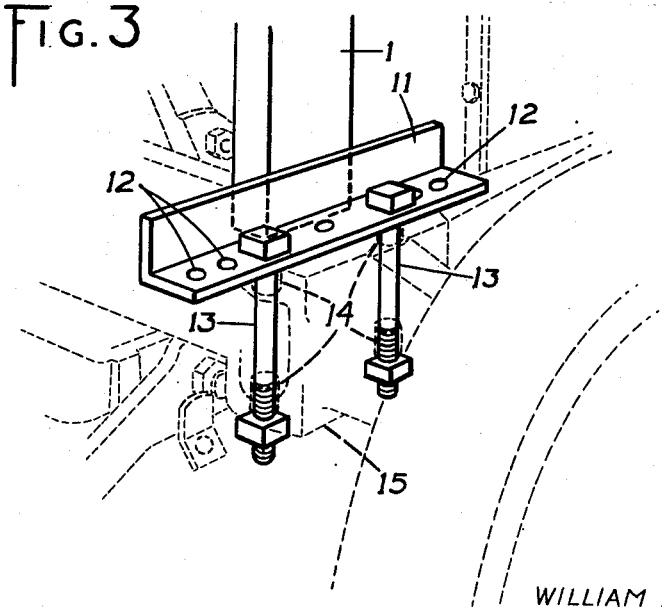

2,647,794

UNITED STATES PATENT OFFICE 2,647,794

SPRAY RIG SUPPORTING FRAME FOR FARM TRACTORS

William A. Mueller, Albert R. West, and Robert B. West, Decatur, Ill.

Application September 24, 1951, Serial No. 247,986

3 Claims. (Cl. 299—30)

1

This invention relates to a framework to be mounted on a conventional farm tractor, the same to support and hold a barrel or tank, for spraying farm crops with insecticide and/or herbicide.

While it is true that the invention is used for spraying insecticide and/or herbicide, it is deemed advantageous to a clear understanding of the description and specification to use the one term insecticide, as any suitable liquid may be used for the purpose intended.

The invention is directed to a detachable framework adapted to be mounted on a farm tractor, the framework to hold in a secure manner a barrel or tank of insecticide so that the insecticide can be sprayed upon the growing crop either while the crop is being cultivated and worked or without the cultivation. The mounting for the barrel or tank on the framework is such that the barrel for the insecticide is positioned behind the operator of the tractor out of his field of vision and further that the bottom of the barrel and the framework holding the same is removed from the ground a distance so that neither the barrel nor the framework touches and thereby injures medium size vegetation, that is, vegetation large enough to be cultivated or worked.

Further, the framework for the barrel containing the insecticide is spaced and arranged so that the framework does not come in contact or interfere with the manipulation of the ground working implements of the tractor whether the implements are engaged in the ground or elevated so as not to cultivate the crop or vegetation being sprayed.

In describing the invention in detail, reference is made to the accompanying drawings, in which—

Fig. 1 shows the framework for the barrel support in full lines and the tractor, the spray boom, ground working implements and barrel containing the insecticide in dotted lines.

Fig. 2 shows one type of axle mounting or support for the framework used with a tractor having a round axle housing.

Fig. 3 shows the axle mounting or support for the framework used with a tractor having a square axle housing, with bolts in through engagement with the housing.

Referring to the drawings, the reference numeral 1 represents the upright channel members in the shape of an L positioned inside of the rear tractor wheels and attached to the axle housing of the tractor, the base or lower portion 2 of the same is shown in Fig. 2 being supported on the rounded axle housing 3 of the tractor. Welded to or attached to the L-shaped uprights 1 at the angle between the uprights 1 and their bases or lower portions 2 are the angle irons 4 having therein a series of openings 5 to receive the bolts 6. Angle irons 7 which engage the lower side of the axle housing 3 have also therein a series of openings 8 to receive the bolts 6. Threaded in the outer ends of the bases or lower portions 2 of the uprights 1 are adjusting screws 9 having locknuts 10. The above attaching means for the supports of the framework on the axle housing of a tractor gives a three point support on a rounded axle housing when the bolts 6 are tightened up, and also provides means for vertically adjusting the uprights 1 through the adjusting screws 9.

In Fig. 3 is shown the arrangement for attaching the framework to a square axle housing 15 of a tractor. This comprises the upright supports 1 and angle irons 11 attached to the bottom of the uprights at one side, as by welding, the angle irons 11 in the form of plates having a series of holes 12 therein and bolts 13 which penetrate holes 14 in the axle housing 15. The attaching means in Fig. 3 are similar to those in Fig. 2 except there are no means corresponding to the screws 9 to give the vertical adjustment for the uprights 1. While only one support for the framework for holding the barrel B is shown in Figs. 2 and 3, it must be realized that there is a corresponding like support on the far side of the axle housing used in each figure.

Attached to the top of the uprights 1 by bolts 16 are the adjustable brace members each comprising the elements 17 and 18, said elements having at their overlapping ends corresponding bolt holes 19 to receive the bolts and nuts 20 to thereby adjust the length of the brace members 17 and 18. These brace members 17 and 18 are attached to the front end of the tractor through bolts 21 to brackets 22. Through the bracing elements comprising the brace members 17 and 18 the vertical position of the uprights 1 can be adjusted. Likewise, through the set screws 9 the vertical position of the uprights 1 can be adjusted. By these adjustments the whole of the framework and the barrel support can be leveled regardless of the make or construction of the tractor on which the framework is mounted. On the uprights 1 about midway between the top thereof and the foot 2 are suitably bolted rearwardly extending horizontally disposed angle irons 23, hereafter called arms, the other end of the arms 23 being suitably bolted to the vertical angle irons 24 which form the rear of the supporting framework for the barrel or tank B. Between the horizontal arms 23 are the cross angle irons 25 which form a framework for the tank or barrel cradles. Supported on the cross angle irons 25 are the wooden barrel cradles 26 attached to the cross angle irons 25 by bolts 27. In the base of the cross angle irons 25 are a series of holes 28 which allow the barrel cradles 26 to be moved in relation to each other to fit barrels of different size. The cross angle irons 25 are attached to the rearwardly extending arms 23 by bolts 29. The rear angle irons 25 are braced by the braces 30 which extend from the horizontal arms 23 to the base of the cross angle irons 25. These braces are attached to the respective angle irons by bolts 31. The rearwardly extending arms 23 are braced and supported from the top of the uprights 1 by the diagonally adjustable braces comprising the elements 32 and 33. These brace elements have corresponding bolt holes 34 at their overlapping inner ends through which an adjustment in the length of the brace members through the bolts and nuts 35 can be made. The tops of the brace members 32 are attached to the uprights 1 by bolts 16 which also attach the forwardly extending brace elements 18. The lower ends of the brace elements 33 are attached to the rearwardly extending arms 23 by the bolts 33'. Braces 36 extend diagonally from the rearward end of the horizontal arms 23 to about the middle of the rearward uprights 24 and the connection between the braces 36 and the uprights 24 and the horizontally extending arms 23 is through the bolt and nut assemblies 37. Extending from the top of the supports 1 through the pulleys 38 at the top of the rearward uprights 24 and to the clamps 40 on the spray boom marked S. B. are the cables 38', adapted to support the outer portions of the spray boom S. B.

Shown in dotted lines behind the working implements in Fig. 1 is said spray boom, which is attached to and carried by said uprights 24 by bolts and nuts 41 engaging suitable holes in the spray boom.

Means for holding the barrel or tank B in the barrel cradles 26 may take any conventional form, but I have shown said means comprising a cable device 42, the ends of which are attached to the cross angle irons 25, the upper portion of the barrel B being encircled by the cable.

As the spray boom, the tank or barrel, the working ground implements and the pumping mechanism form no part of this application except as used in this combination, these elements are shown in dotted lines only.

From the above in connection with the drawings, it will be seen that I have devised a practical and sturdy spray barrel support which can be easily attached to and detached from a conventional farm tractor.

Further, the construction is such that the level of the barrel or tank can be adjusted so that the same is mounted in a level position. The level position of a spray barrel or tank is important in that it allows the fluid contained within the barrel or tank to be dispensed in an adjusted regulated manner.

Further, the invention contemplates a barrel support which is constructed so that the same does not interfere with the manipulation and operation of the ground working implements, which means that the spraying can be done at the same time the crop is being cultivated or worked.

Further, the spraying mechanism and tank are removed from the ground sufficiently so that the same does not come in contact with and injure the vegetation being worked and/or sprayed.

The several elements making up the framework are duplicate parts in that all of the parts used as a support on one side of the tractor have a counterpart for the opposite side of the tractor. This is also true of the elements making up the platform for the barrel cradle. A construction in which the elements are alike and uniform, as in this construction, provides a cheap manufacturing outlay in that there are no special pieces used in the construction as all elements are duplicates.

What we claim is:

1. In a spray outfit attachment for farm tractors, the same comprising supports for said spray outfit, said supports being vertical L-shaped uprights attached to the rear axle housing of a tractor, adjustable braces extending from the top of the vertical supports to the front frame of the tractor on each side thereof, horizontally disposed arms extending from said vertical supports rearwardly of the forward adjustable braces, said horizontally disposed arms being attached to said vertical supports midway between the attachment of the said supports to said tractor housing and the adjustable braces running from the top of said supports to the front of the tractor frame, a platform mounted on the horizontally disposed arm, said platform having thereon a cradle attachment for holding a barrel.

2. In a spray outfit attachment for farm tractors, the same comprising supports for said spray outfit, said supports being vertical L-shaped uprights attached to the rear axle housing of a tractor, adjustable braces extending from the top of the vertical supports to the front frame of the tractor on each side thereof, horizontally disposed arms extending from said vertical supports rearwardly of the forward adjustable braces, said horizontally disposed arms being attached to said vertical supports midway between the attachment of the said supports to said tractor axle housing and the adjustable braces running from the top of said supports to the front of the tractor frame, a platform mounted on the horizontally disposed arms, said platform having thereon a cradle attachment for holding a barrel, vertical angle irons attached to the rear of the horizontally disposed arms, and braces extending from the top of said vertical angle irons attached to the housing of the rear axle of the tractor extending to the vertical angle irons attached to the rear of the horizontally disposed arms, and a spray boom attached to the bottom of said vertical angle irons with braces extending from adjacent the outer ends of the spray boom to the tops of the vertical angle irons to the rear of said horizontally disposed arms.

3. In a spray outfit attachment for farm tractors, the same comprising upright channel members in the shape of an L, means for attaching the lower shorter portion of the upright channel L-shaped member to the housing of the rear axle of a tractor, said means comprising plates having bolt holes attached to the upper faces of the shorter portion of the vertical L-shaped uprights, plates having bolt openings engaging the bottom of the axle housing with bolts penetrating between the openings in said plates, means for adjusting the vertical position of the upright portion of the L-shaped supports, said means comprising adjustable braces extending from the top of the L-shaped supports on each side of the tractor frame to the front of the tractor frame and set screws on the outer ends of the plate attached to shorter portion of the channel members to also engage the tractor axle housing.

WILLIAM A. MUELLER.
ALBERT R. WEST.
ROBERT B. WEST.

References Cited in the file of this patent

UNITED STATES PATENTS

| Number | Name | Date |
| --- | --- | --- |
| 2,356,950 | Root | Aug. 29, 1944 |
| 2,425,419 | Carnes | Aug. 12, 1947 |
| 2,565,587 | Boyett | Aug. 28, 1951 |
| 2,594,284 | Blue | Apr. 29, 1952 |
| 2,596,473 | Essick | May 13, 1952 |